United States Patent [19]

Schreiber

[11] Patent Number: 4,892,433

[45] Date of Patent: Jan. 9, 1990

[54] PROCESS FOR PRODUCING A JOINT BETWEEN A METALLIC INNER SLEEVE AND A TUBE OF FIBER-REINFORCED PLASTIC MATERIAL AND THE RESULTING JOINT PRODUCED THEREBY

[75] Inventor: Wolfgang Schreiber, Sontra, Fed. Rep. of Germany

[73] Assignee: Volkwagen AG, Wolfsburg, Fed. Rep. of Germany

[21] Appl. No.: 217,640

[22] Filed: Jul. 12, 1988

[30] Foreign Application Priority Data

Aug. 29, 1987 [DE] Fed. Rep. of Germany ....... 3728978

[51] Int. Cl.⁴ .............................................. B25G 3/10
[52] U.S. Cl. .................................... 403/359; 403/282; 403/284
[58] Field of Search ............... 403/282, 277, 291, 284, 403/359; 29/507

[56] References Cited

U.S. PATENT DOCUMENTS

| | | | |
|---|---|---|---|
| 3,820,579 | 6/1974 | Barry | 403/282 |
| 4,256,413 | 3/1981 | Abe | 403/282 |
| 4,773,789 | 9/1988 | Jilken | 403/277 |

*Primary Examiner*—Andrew V. Kundrat
*Assistant Examiner*—Carol I. Bordas
*Attorney, Agent, or Firm*—Brumbaugh, Graves, Donohue & Raymond

[57] ABSTRACT

In order to provide a torque-transmitting joint comprising a tube of fiber-reinforced plastic material and a metallic inner sleeve which has a knurled outer surface, the inner sleeve is pressed into retaining regions of the tube having reinforcing fibers extending substantially entirely in the circumferential direction, whereby the knurling produces a counter-knurling because of the visco-elastic deformation of the material of the retaining regions.

3 Claims, 1 Drawing Sheet

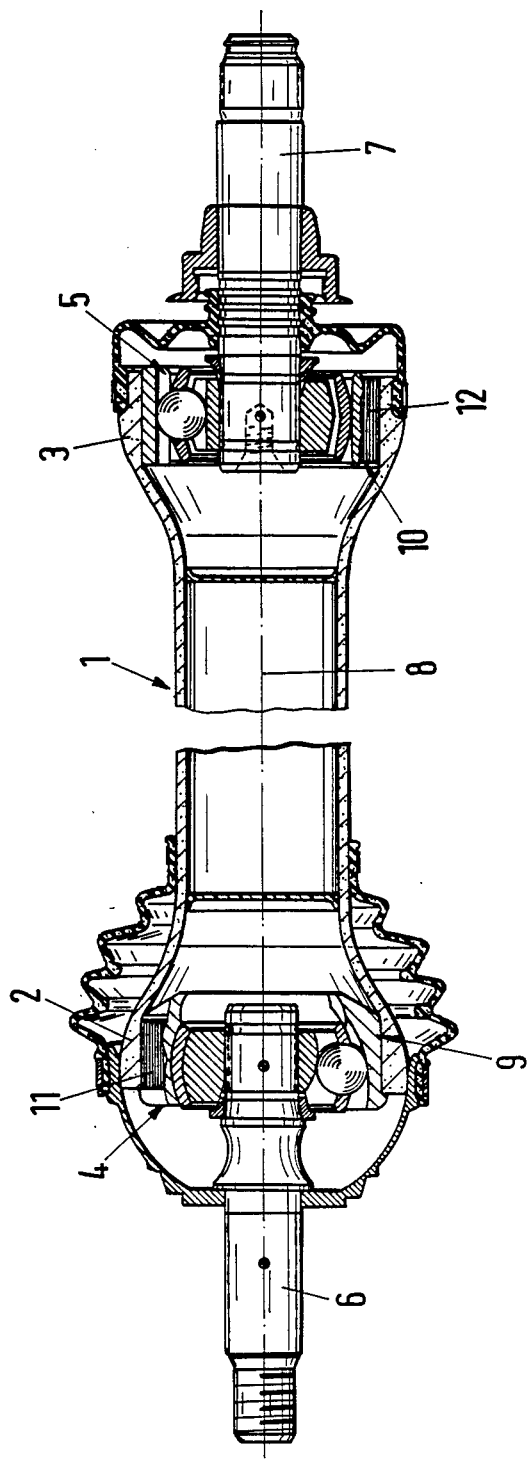

PROCESS FOR PRODUCING A JOINT BETWEEN A METALLIC INNER SLEEVE AND A TUBE OF FIBER-REINFORCED PLASTIC MATERIAL AND THE RESULTING JOINT PRODUCED THEREBY

BACKGROUND OF THE INVENTION

This invention relates to the production of joints between metallic and plastic components and, more particularly, to a new and improved joint and process for producing such a joint.

In many applications, hollow, i.e., tubular, torsion-stressable shafts of fiber-plastic compound materials containing glass or carbon fibers are utilized for reasons of weight and noise reduction, for example, in the torque transmission between a driving unit, on the one hand, and a differential gear unit, on the other hand, of an automobile. The construction of the joint between the ends of such a torsion tube and adjacent couplings, such as constant-velocity couplings, having components which are made of rigid material such as metal, is difficult. Attempts to join such plastic and metal components with cement have not been very promising, in spite of extensive efforts. The provision of clamping sleeves on the retaining region of such a torsion tube poses problems of extra expenditures of material and labor, at least in large-scale manufacture, such as in the automobile industry.

In German Patent No. 27 28 306, a rigid connection between a fiber-reinforced synthetic resin shaft and a coaxial metallic drive component, such as a component of a constant velocity coupling, has an inner sleeve with a knurled outer surface on which the resin shaft is mounted, the inner sleeve being subsequently joined to the coupling proper by welding. In this case, the bond between the inner sleeve and the shaft is achieved by a hardening heat treatment. As a result of this treatment, the resin is bonded to the inner sleeve. This method, which uses a knurled outer surface on the inner sleeve, requires a relatively complex fabrication procedure.

SUMMARY OF THE INVENTION

Accordingly, it is an object of the present invention to provide a process for joining a metal member having a knurled outer surface to a surrounding fiber-plastic material which overcomes the above-mentioned disadvantages of the prior art.

Another object of the invention is to provide a new and improved joint between a metal member and a surrounding fiber-plastic material which, while offering simplicity of manufacture and the elimination of additional parts, such as tension rings, complies with all requirements for perfect torque transmission.

These and other objects of the invention are attained by providing a fiber-plastic material having fibers which extends substantially in the circumferential direction around the periphery of the knurled outer surface of a metal member. Preferably, the fiber-plastic material is formed with an inner diameter which is slightly smaller than the outer diameter of the knurled surface and the members are joined by axial pressure which elastically expands the inner diameter of the fiber-plastic member.

Thus, the connection is obtained according to the invention in a simple manner by pressing the inner metal member into the inner diameter of the plastic member under elastic deformation of the latter, so that the knurling on the outer surface of the metal member impresses a counter-knurling, as it were, into the inner surface of the plastic member facing the outer metal surface. This avoids any necessity for forming the plastic member by cutting and also any intervention in the production of the plastic member except for the circumferential alignment of the fibers in the region which engages the inner metal member.

This elimination of any and all cutting work while utilizing the elasticity of the plastic material constitutes an improvement over the process of German Offenlegungsschrift No. 23 47 372. According to that disclosure, an inner sleeve or the like is provided with outer teeth extending parallel to the axis and one of the end faces of the teeth is hardened to form a cutting surface so that on compression of the two components, the cutting surfaces cut corresponding teeth into the mating surface of the outer of the two components. The same arrangement is disclosed in German Offenlegungsschrift No. 30 07 896, which, moreover, requires tension rings.

BRIEF DESCRIPTION OF THE DRAWING

Further objects and advantages of the invention will be apparent from a reading of the following description in conjunction with the accompanying drawing which is a view in longitudinal section illustrating a representative embodiment of the invention in the form of a torsion tube-coupling connection forming part of the drive train of an automobile.

DESCRIPTION OF PREFERRED EMBODIMENT

In the typical embodiment of the invention shown in the drawing, a tubular torsion shaft 1 made, for example, of fiberglass-reinforced plastic material, is formed at the ends with tubular retaining regions 2 and 3 having enlarged diameter. Two constant-velocity swivel couplings 4 and 5, which have a conventional structure and therefore need not be explained in detail, are joined to the retaining regions 2 and 3, respectively, as described in greater detail hereinafter. An input shaft 7 associated with the coupling 5 is connected in the customary manner by way of the differential gear to the drive unit of the vehicle, not shown, while an output shaft 6 from the coupling 4 is connected to the driven wheels, not shown.

As shown in the drawing, the wall thicknesses of the retaining regions 2 and 3 are thicker than those of the middle portion of the torsion shaft 1. In the thicker regions 2 and 3, the reinforcing fibers extend substantially entirely in the circumferential direction, i.e., without any significant directional components in the direction of the axis 8 of the system.

The constant-velocity couplings 4 and 5 have identical outer contours and they have corresponding outer sleeves 9 and 10 which define their outer dimensions. The sleeves 9 and 10 have knurled outer surfaces 11 and 12, respectively, with relatively low teeth extending parallel to the axis 8, as partially illustrated in the drawing.

Before the sleeves 9 and 10 which constitute inner cylindrical members in the couplings 4 and 5 are pressed into the retaining regions 2 and 3, those regions have an inside diameter which is somewhat smaller than the outer diameters of the sleeves 9 and 10 measured between the tips of the knurlings 11 and 12. This difference in dimensions is small so that when the sleeves 9 and 10 are pressed into the retaining regions by application of compressive forces parallel to the axis 8, an elastic enlargement of the retaining regions 2 and 3 is achieved without any cracking or chipping-off of the plastic material. Because of the circumferential alignment of the fibers in the plastic material in the retaining regions 2 and 3, a reliable torque transmission is provided by assembly of the joint. This results from the clamping forces which are caused by the elastic expansion of the retaining regions, and in particular because of a very close fit between the knurlings 11 and 12, on the one hand, and the counter-teeth produced by viscoelastic deformation in the retaining regions 2 and 3, on the other hand. Moreover, because of the radial pressure, the joints 4 and 5 are also secured against slipping out of the retaining regions 2 and 3 in the axial direction.

Tests have shown that, following pressing-in of the sleeves 9 and 10, the very high tangential tensile stresses occurring in the retaining regions 2 and 3 can be absorbed very well even over an extended period of time by the circumferentially aligned fibers of the torsion tube 1 because of the linear-elastic properties of the fibers. Neither additional mechanical working of the tube 1 nor the addition of outer tension rings or the like is required.

Accordingly, the invention provides an excellent joint between plastic and metal members and also provides a process for producing such a joint conveniently which ensures durable and faultless torque transmission.

Although the invention has been described herein with reference to a specific embodiment, many modifications and variations therein will readily occur to those skilled in the art. Accordingly, all such variations and modifications are included within the intended scope of the invention.

I claim:

1. A process for producing a joint between an inner cylindrical member of rigid material having a knurled outer surface and a fiber-reinforced plastic member, comprising providing an elastically deformable tubular cylindrical member retaining region at an end of the fiber-reinforced plastic member in which the fibers extend substantially entirely in the circumferential direction about the axis of the tubular retaining region and which has an inner diameter slightly smaller than the outer diameter of the knurled surface of the cylindrical member, and pressing the inner cylindrical member into the tubular retaining region so as to apply force in the radial direction to the tubular region, thereby causing elastic enlargement of the retaining region.

2. A joint between an inner member and a tubular region of a fiber-reinforced plastic member comprising an inner cylindrical member made of rigid material and having a knurled outer surface and a fiber-reinforced plastic member having an elastically deformable tubular cylindrical member-retaining region in mating contact with the knurled surface, the retaining region having reinforcing fibers which extend substantially entirely in the circumferential direction about the axis of the tubular retaining region and being press-fitted on the knurled outer surface of the cylindrical member so as to apply force in the radial direction to the tubular retaining region, thereby causing elastic enlargement of the tubular retaining region.

3. A joint according to claim 2 wherein the tubular cylindrical member-retaining region has an outer diameter which is larger than the diameter of the remainder of the fiber-reinforced plastic member.

* * * * *